(12) United States Patent
Wu et al.

(10) Patent No.: US 11,143,272 B2
(45) Date of Patent: Oct. 12, 2021

(54) DUAL-SHAFT CLUTCH VARYING SPEED DEVICE

(71) Applicant: INDUSTRIAL TECHNOLOGY RESEARCH INSTITUTE, Hsin-Chu (TW)

(72) Inventors: Meng-Ru Wu, Taipei (TW); Chia Tsao, New Taipei (TW); Peng-Yu Chen, Toufen (TW); Jui-Tang Tseng, Hsinchu (TW); Cheng-Ping Yang, Taoyuan (TW); Po-Wen Chen, Tainan (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 979 days.

(21) Appl. No.: 15/835,022

(22) Filed: Dec. 7, 2017

(65) Prior Publication Data
US 2019/0120328 A1    Apr. 25, 2019

(30) Foreign Application Priority Data

Oct. 20, 2017   (TW) .................................. 106136224

(51) Int. Cl.
*F16H 3/089*  (2006.01)
*F16H 37/08*  (2006.01)
(Continued)

(52) U.S. Cl.
CPC ............... *F16H 3/10* (2013.01); *F16D 11/02* (2013.01); *F16H 3/089* (2013.01);
(Continued)

(58) Field of Classification Search
CPC ... F16H 3/089; F16H 37/0813; F16H 37/0826
(Continued)

(56) References Cited

U.S. PATENT DOCUMENTS 2,972,899 A * 2/1961 Wiggermann ........ F16H 37/042
74/329
4,095,665 A    6/1978 Armfield
(Continued)

FOREIGN PATENT DOCUMENTS

CN    201866176 U    6/2011
CN    103195880 A    7/2013
(Continued)

OTHER PUBLICATIONS

Taiwan Patent Office, Office Action, Patent Application Serial No. TW106136224, dated Jun. 27, 2018, Taiwan.
(Continued)

*Primary Examiner* — Ha Dinh Ho
(74) *Attorney, Agent, or Firm* — Rabin & Berdo, P.C.

(57) ABSTRACT

A dual-shaft clutch varying speed device includes a drive unit, an input shaft, an output shaft, a housing, at least an odd-numbered clutch unit and at least an even-numbered clutch unit. The input shaft having an input gear is coupled with the drive unit. The output shaft, having an end thereof penetrate through the input shaft and the drive unit, has at least an odd-numbered output gear and at least an even-numbered output gear. The housing has a housing gear. The at least one odd-numbered clutch unit being furnished at the inner part of the housing has an odd-numbered clutch shaft and an odd-numbered clutch gear which is meshed with the odd-numbered output gear. The at least one odd-numbered clutch unit has an even-numbered clutch shaft and an even-numbered clutch gear which is meshed with the even-numbered output gear.

20 Claims, 4 Drawing Sheets

(51) Int. Cl.
*F16H 3/10* (2006.01)
*F16D 11/02* (2006.01)
*F16D 11/00* (2006.01)
*B60W 20/30* (2016.01)
*B60W 10/08* (2006.01)
*B60W 10/12* (2012.01)

(52) U.S. Cl.
CPC ..... *F16H 37/0813* (2013.01); *F16H 37/0826* (2013.01); *B60W 10/08* (2013.01); *B60W 10/12* (2013.01); *B60W 20/30* (2013.01); *B60W 2710/081* (2013.01); *F16D 2011/008* (2013.01)

(58) Field of Classification Search
USPC .......................................................... 74/330
See application file for complete search history.

(56) References Cited

U.S. PATENT DOCUMENTS

| | | | |
|---|---|---|---|
| 4,579,015 A * | 4/1986 | Fukui | B60W 30/18 74/329 |
| 4,960,005 A * | 10/1990 | Kashiwase | F16H 3/097 74/329 |
| 5,417,125 A | 5/1995 | Janiszewski | |
| 5,667,029 A | 9/1997 | Urban et al. | |
| 6,209,407 B1 | 4/2001 | Heinzel et al. | |
| 7,316,627 B2 | 1/2008 | Bennett | |
| 7,390,278 B2 | 6/2008 | Krisher | |
| 7,891,263 B2 | 2/2011 | Mowbray et al. | |
| 8,454,473 B2 | 6/2013 | Reitz | |
| 8,556,760 B2 | 10/2013 | Mack et al. | |
| 8,597,149 B2 * | 12/2013 | Potter | F16H 37/046 475/219 |
| 9,073,538 B2 | 7/2015 | Mack et al. | |
| 9,221,334 B2 | 12/2015 | Knoblauch | |
| 9,267,510 B2 | 2/2016 | Tadokoro et al. | |
| 9,637,127 B1 | 5/2017 | Cooper | |
| 9,897,165 B2 * | 2/2018 | Mordukhovich | F16H 37/046 |
| 2005/0026732 A1 | 2/2005 | Krisher et al. | |
| 2009/0088287 A1 | 4/2009 | Chludek et al. | |
| 2010/0267508 A1 | 10/2010 | Hvolka et al. | |
| 2014/0228165 A1 | 8/2014 | Frank et al. | |

FOREIGN PATENT DOCUMENTS

| | | |
|---|---|---|
| CN | 206000985 U | 3/2017 |
| CN | 206049355 U | 3/2017 |
| CN | 106979281 A | 7/2017 |
| CN | 106979304 A | 7/2017 |
| CN | 107191552 A | 9/2017 |
| JP | 5933125 B2 | 6/2016 |
| TW | 291936 | 11/1996 |
| TW | 509651 B | 11/2002 |
| TW | M365603 U | 9/2009 |
| TW | I393825 B | 4/2013 |
| TW | I534037 B | 5/2016 |
| TW | M541539 U | 5/2017 |
| TW | M542715 U | 6/2017 |
| TW | 201725136 A | 7/2017 |

OTHER PUBLICATIONS

Faid, A Highly Efficient Two Speed Transmission for Electric Vehicles, EVS28, Kintex, Korea, May 3-6, 2015, pp. 1-22.

Viotto, A Novel Seamless 2-Speed Transmission System for Electric Vehicles: Principles and Simulation Results, Electronic Systems for Vehicle Propulsion Symposium, Nov. 8-9, 2011, Detroit, MI.

Sorniotti et al., Analysis and Simulation of the Gearshift Methodology for a Novel Two-Speed Transmission System for Electric Powertrains With Central Motor, pp. 1-46.

Grewe et al., Defining the General Motors 2-Mode Hybrid Transmission, SAE International, 2007.

Caricchi et al., Design and Construction of a Wheel-Directly-Coupled Axial-Flux PM Motor Prototype for EVs, pp. 254-261.

Holdstock, Investigation into multiple-speed transmissions for electric vehicles, pp. 1-187.

CN Office Action dated Aug. 8, 2020 for Application No. 201711114725.3.

Xu et al., Vehicle Structure (Part B), National Automobile: Context, Experience, Expansion, Interaction [1+1} A realized Integrated Planning Textbook, Harbin Institute of Technology Press, Jul. 2013, pp. 80-82.

Zhu et al., Basics of Mechanical Design, Institutions of Higher Learning "135" Planning Textbook, Chongqing University Press, Aug. 31, 2016, Chapter 12.5 Gear Speed Reducer, p. 215.

* cited by examiner

DUAL-SHAFT CLUTCH VARYING SPEED DEVICE

CROSS REFERENCE TO RELATED APPLICATION

This application also claims priority to Taiwan Patent Application No. 106136224 filed in the Taiwan Patent Office on Oct. 20, 2017, the entire content of which is incorporated herein by reference.

FIELD OF THE DISCLOSURE

The disclosure relates to a dual-shaft clutch varying speed device, and more particularly, to a dual-shaft clutch varying speed device that employs dual-shaft structure to attain the object of diminishing the size of the device.

DESCRIPTION OF THE PRIOR ART

Varying speed mechanism, that provides the requirements of different speed or torque when the vehicle is moving, is an indispensable component of an electrical vehicle/conventional vehicle (hereafter referred to as a vehicle).

The above-mentioned speed and torque conversion is achieved through a multiple of gears, thereby the existing varying speed mechanism has a combination of a multiple of gears therein. However, the gear combination makes the size of the existing gearbox relatively too large, and since the relatively larger size of varying speed mechanism will cause the difficulty in the design of the vehicle in that it needs a relatively larger space to contain the existing varying speed mechanism.

In addition, the existing transmission system has the shortcomings of being large in total volume and low in power density since the drive and transmission thereof are independent respectively.

Although some manufacturers intend to employ the clutch to reduce the size of the varying speed mechanism, its reducing amount is limited. Therefore, just how to reduce the size of the existing varying speed mechanism still has rooms to be improved.

SUMMARY OF THE DISCLOSURE

The disclosure is a dual-shafts clutch varying speed device, comprising:
  a drive unit;
  an input shaft having an input gear is coupled with the drive unit;
  an output shaft with an end thereof penetrates through the input shaft and the drive unit while its other end has at least an odd-numbered output gear and at least an even-numbered output gear;
  a housing having a housing gear;
  at least an odd-numbered clutch unit being furnished at the inner part of the housing has an odd-numbered clutch shaft and an odd-numbered clutch gear; and
  at least an even-numbered clutch unit being furnished at the inner part of the housing has an even-numbered clutch shaft and an even-numbered clutch gear;
  wherein one end of the odd-numbered clutch shaft penetrates through the even-numbered clutch shaft and juts out of the even-numbered clutch shaft, and the odd-numbered clutch gear is furnished at an end where the odd-numbered clutch shaft juts out of the even-numbered clutch shaft. the odd-numbered clutch gear is meshed with the odd-numbered output gear, one end of the odd-numbered clutch shaft penetrates through the even-numbered clutch shaft and juts out of the even-numbered clutch shaft), and the odd-numbered clutch gear is furnished at an end where the odd-numbered clutch shaft juts out of the even-numbered clutch shaft. the odd-numbered clutch gear is meshed with the odd-numbered output gear.

BRIEF DESCRIPTION OF THE DRAWINGS

The accomplishment of this and other objects of the disclosure will become apparent from the following description and its accompanying drawings of which.

DETAILED DESCRIPTION OF THE PREFERRED EMBODIMENT

The following descriptions are embodiments of the disclosure employing some particular concrete examples. Those people skilled in the art are capable of easily realizing the advantages and efficacies of the disclosure through the content disclosed by the patent specification of the disclosure.

Figure 1:
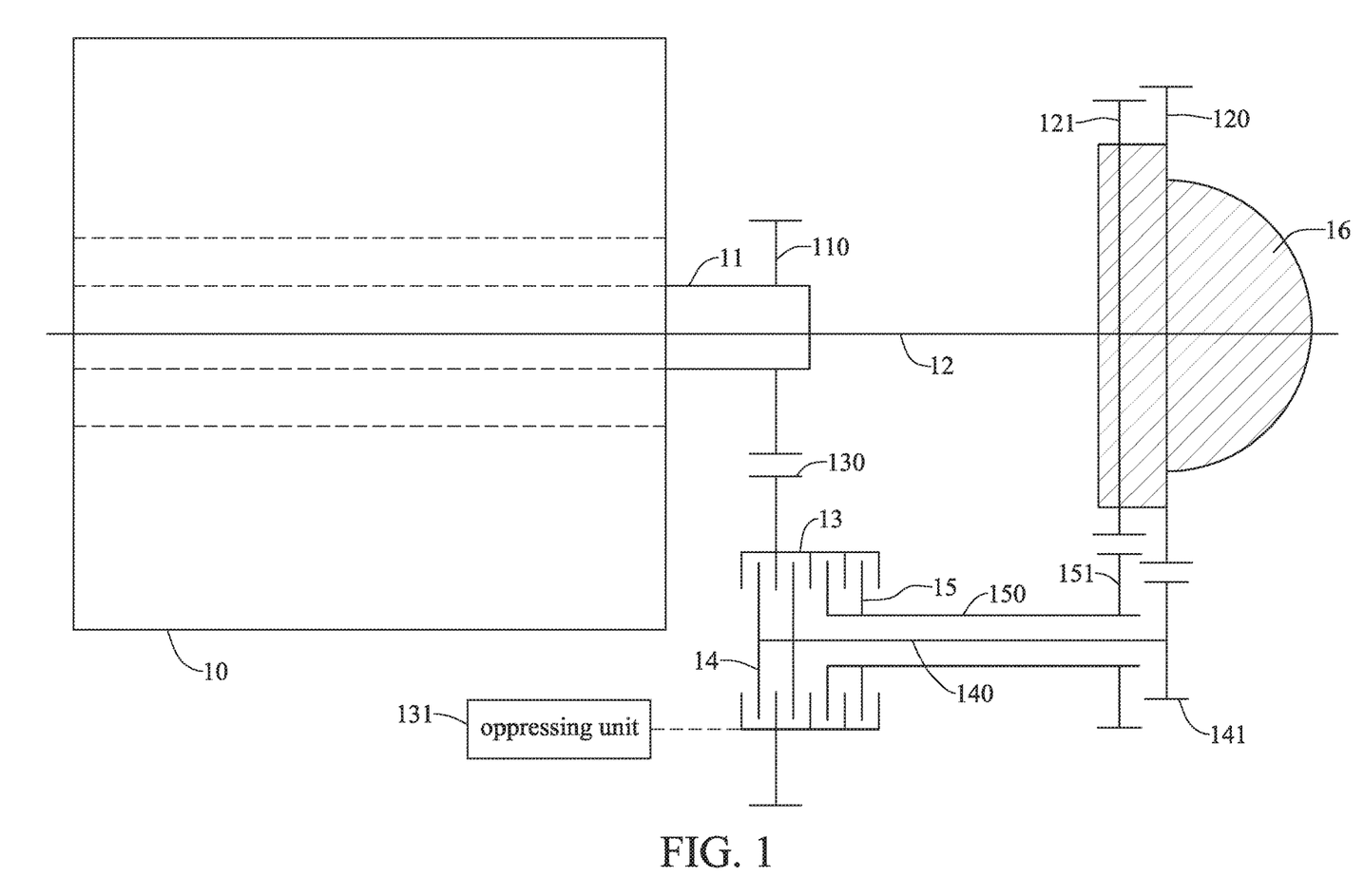
FIG. 1 is a schematic view of the first embodiment of the dual-shaft clutch varying speed device of the disclosure.

FIG. 1 is a schematic view of the first embodiment of the dual-shaft clutch varying speed device of the disclosure. As shown in FIG. 1, the dual-shaft clutch varying speed device of the disclosure includes a drive unit (10), an input shaft (11), an output shaft (12), a housing (13), an odd-numbered clutch unit (14), an even-numbered clutch unit (15) and a differential (16).

The drive unit (10), which makes the input shaft (11) rotates, is an engine or a motor. Moreover, the input shaft (11) having an input gear (110) is coupled with the drive unit (10). What is more, the input gear (110) furnished at the outer edge of the input shaft (11) rotates together with the output shaft (12) which is driven by the drive unit (10).

The input shaft (11) being a hollow shaft is provided for the output shaft (12) to penetrate through therein, thereby, the output shaft (12) and the input shaft (11) forms a dual-shaft structure. One end of the output shaft (12) penetrates through both the input shaft (11) and the drive unit (10), while the other end of the output shaft (12) having an odd-numbered output gear (120) and an even-numbered output gear (121) is connected to the differential (16).

The housing (13) having a housing gear (130) is meshed with the input gear (110). The housing (13) also possesses an oppressing unit (131) which can be an oil pressure device, a pneumatic device, or a brake device.

The odd-numbered clutch unit (14) having an odd-numbered clutch shaft (140) and an odd-numbered clutch gear (141) is furnished inside the housing (13) and is coupled with the oppressing unit (131). Similarly, the even-numbered clutch unit (15) having an even-numbered clutch shaft (150) and an even-numbered clutch gear (151) is furnished inside the housing (13) and is coupled with the oppressing unit (131).

One end of the odd-numbered clutch shaft (140) penetrates through the even-numbered clutch shaft (150) and juts out of the even-numbered clutch shaft (150), and the odd-numbered clutch gear (141) is furnished at an end where the odd-numbered clutch shaft (140) juts out of the even-numbered clutch shaft (150). Moreover, the odd-numbered clutch gear (141) is meshed with the odd-numbered output gear (120), and the odd-numbered clutch shaft (140) is parallel to the output shaft (12).

Similarly, one end of the even-numbered clutch shaft (150) juts out of the housing (13), and the even-numbered clutch gear (151) is furnished at an end where the even-numbered clutch shaft (150) juts out of the housing (13). Moreover, the even-numbered clutch gear (151) is meshed with the even-numbered output gear (121), and the even-numbered clutch shaft (150) is parallel to the output shaft (12).

As described above, the even-numbered clutch shaft (150) is a hollow shaft for providing the odd-numbered clutch shaft (140) to penetrate through therein. The odd-numbered clutch gear (141) being secured at an end of the odd-numbered clutch shaft (140) is rotated together with the odd-numbered clutch shaft (140) while the even-numbered clutch gear (151) is secured at the outer edge of the even-numbered clutch shaft (150) and is rotated with the even-numbered clutch shaft (150).

Figure 2:
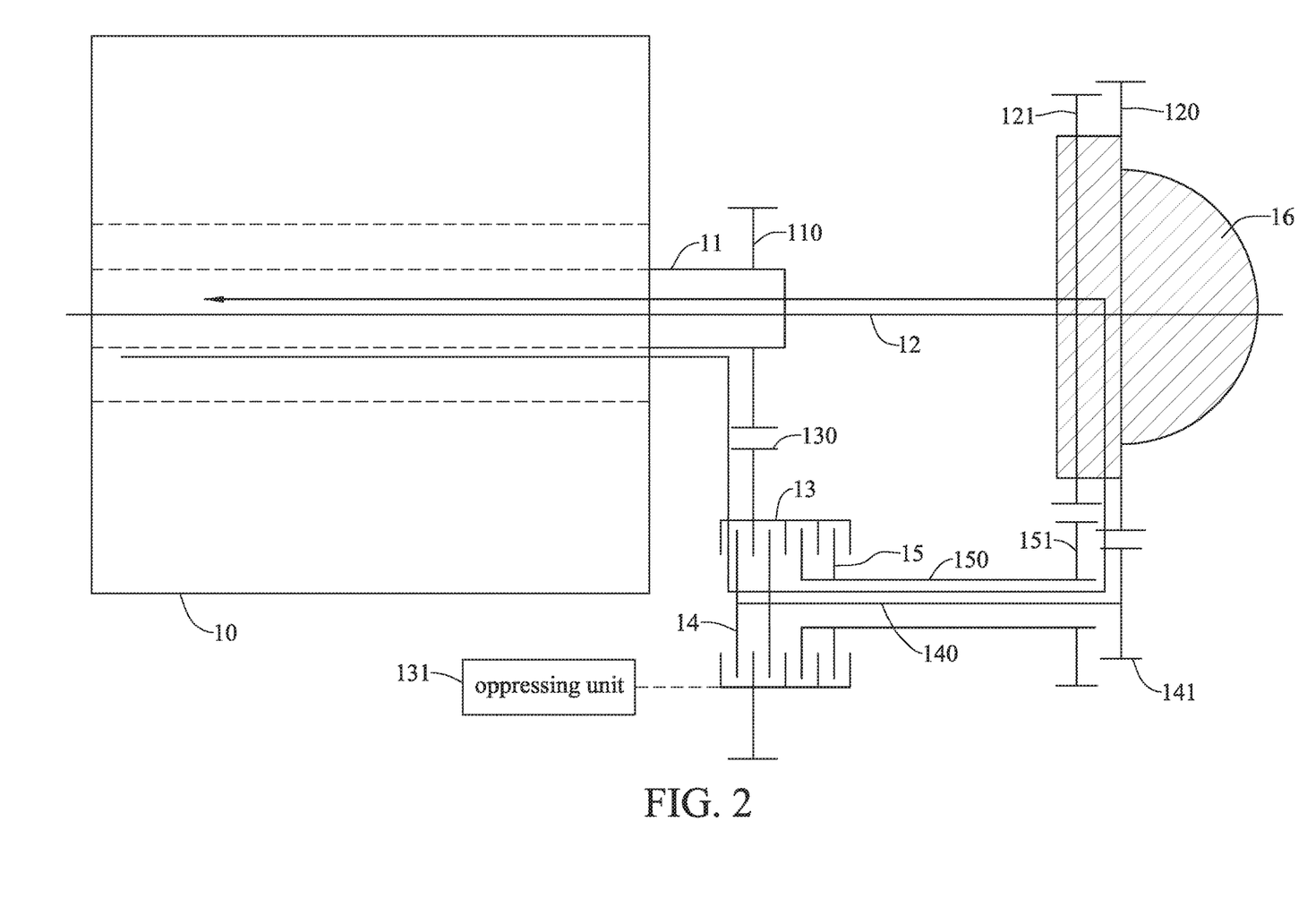
FIG. 2 is a schematic view of the odd-numbered clutch unit at the first gear output of the disclosure.

FIG. 2 is a schematic view of the odd-numbered clutch unit at the first gear output of the disclosure. As shown in FIG. 2, sequentially, the drive unit (10) drives the input shaft (11), the input shaft (11) drives the input gear (110), the input gear (110) drives the housing gear (130), and finally, the housing gear (130) drives the housing (13).

If the oppressing unit (131) is an oil pressure device or pneumatic device, the oppressing unit (131) then provides oil pressure or pneumatic to make the odd-numbered clutch unit (14) tightly oppress the housing (13) and sequentially drives the odd-numbered clutch shaft (140).

However, if the oppressing unit (131) is a brake device, the oppressing unit (131), being furnished inside the housing (13), provides an oppressing force to make the odd-numbered clutch unit (14) tightly oppress the housing (13), and sequentially drives the odd-numbered clutch shaft (140).

Sequentially, the odd-numbered clutch shaft (140) drives the odd-numbered clutch gear (141), the odd-numbered clutch gear (141) drives odd-numbered output gear (120), the odd-numbered output gear (120) drives the output shaft (12), and the output shaft (12) outputs the power originated from the drive unit (10).

The differential (16) driven by the output gear [odd-numbered output gear (120) or even-numbered output gear (121)] to drive the output shaft (12) and make the output shaft (12) outputs torque or power so as to further drive the differential (16).

As described above, the power originated from the drive unit (10) acts as first gear output through the input shaft (11), input gear (110), housing gear (130), housing (13), odd-numbered clutch unit (14), odd-numbered clutch shaft (140), odd-numbered clutch gear (141), odd-numbered output gear (120) and output shaft (12).

Figure 3:
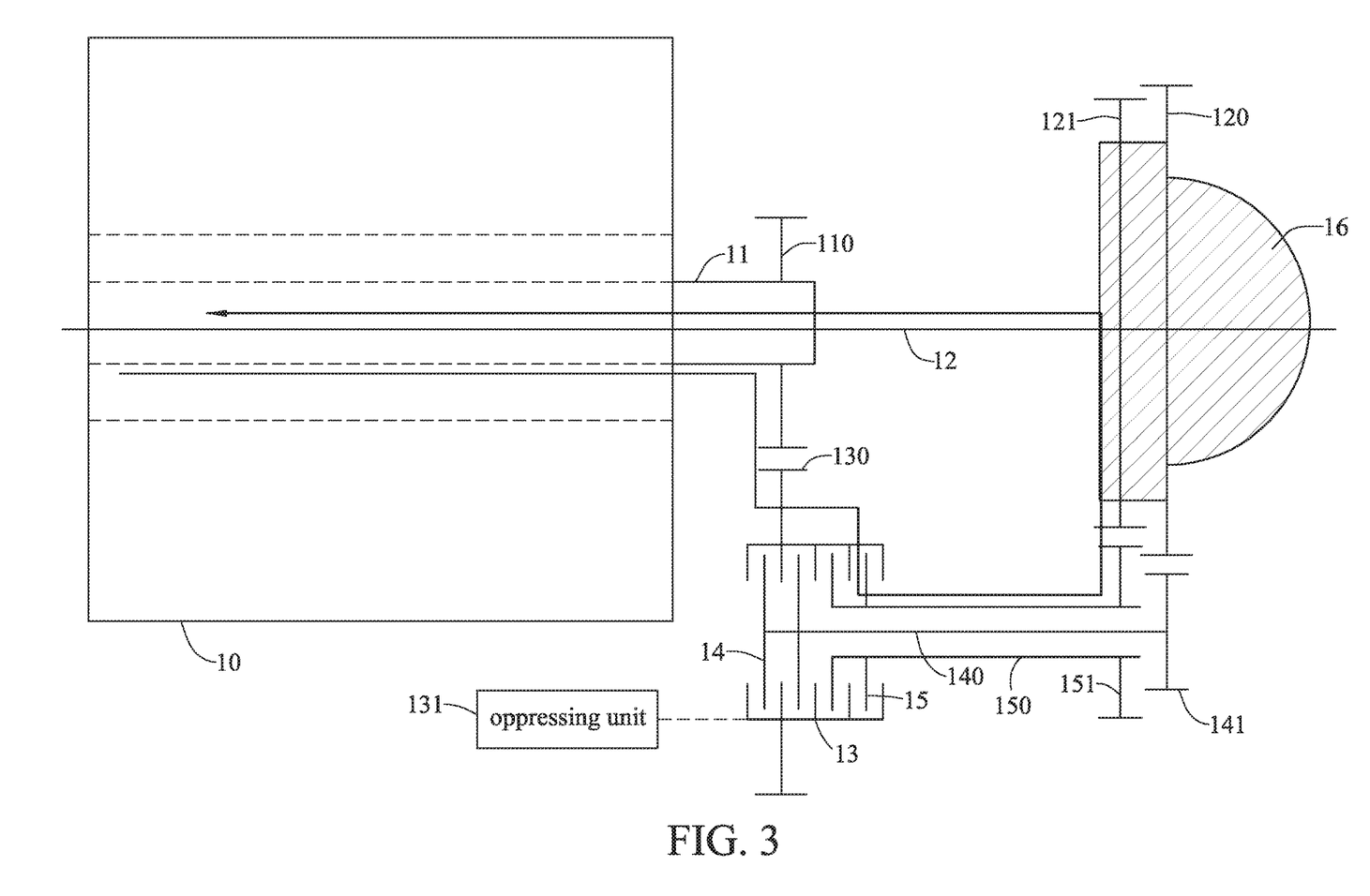
FIG. 3 is a schematic view of the even-numbered clutch unit at the first gear output of the disclosure.

FIG. 3 is a schematic view of the even-numbered clutch unit at the first gear output of the disclosure. As shown in FIG. 3, the oppressing unit (131) makes the odd-numbered clutch unit (14) not to oppress housing (13) anymore while makes the even-numbered clutch unit (15) tightly oppress the housing (13).

Sequentially, the even-numbered clutch unit (15) drives even-numbered clutch shaft (150), the even-numbered clutch shaft (150) drives the even-numbered clutch gear (151), the even-numbered clutch gear (151) drives the even-numbered output gear (121), the even-numbered output gear (121) drives the output shaft (12) and the output shaft (12) outputs the power originated from the drive unit (10).

As described above, the power originated from the drive unit (10) acts as second gear output through the input shaft (11), input gear (110), housing gear (130), housing (13), even-numbered clutch unit (15), even-numbered clutch shaft (150), even-numbered clutch gear (151), even-numbered output gear (120) and output shaft (12).

Figure 4:
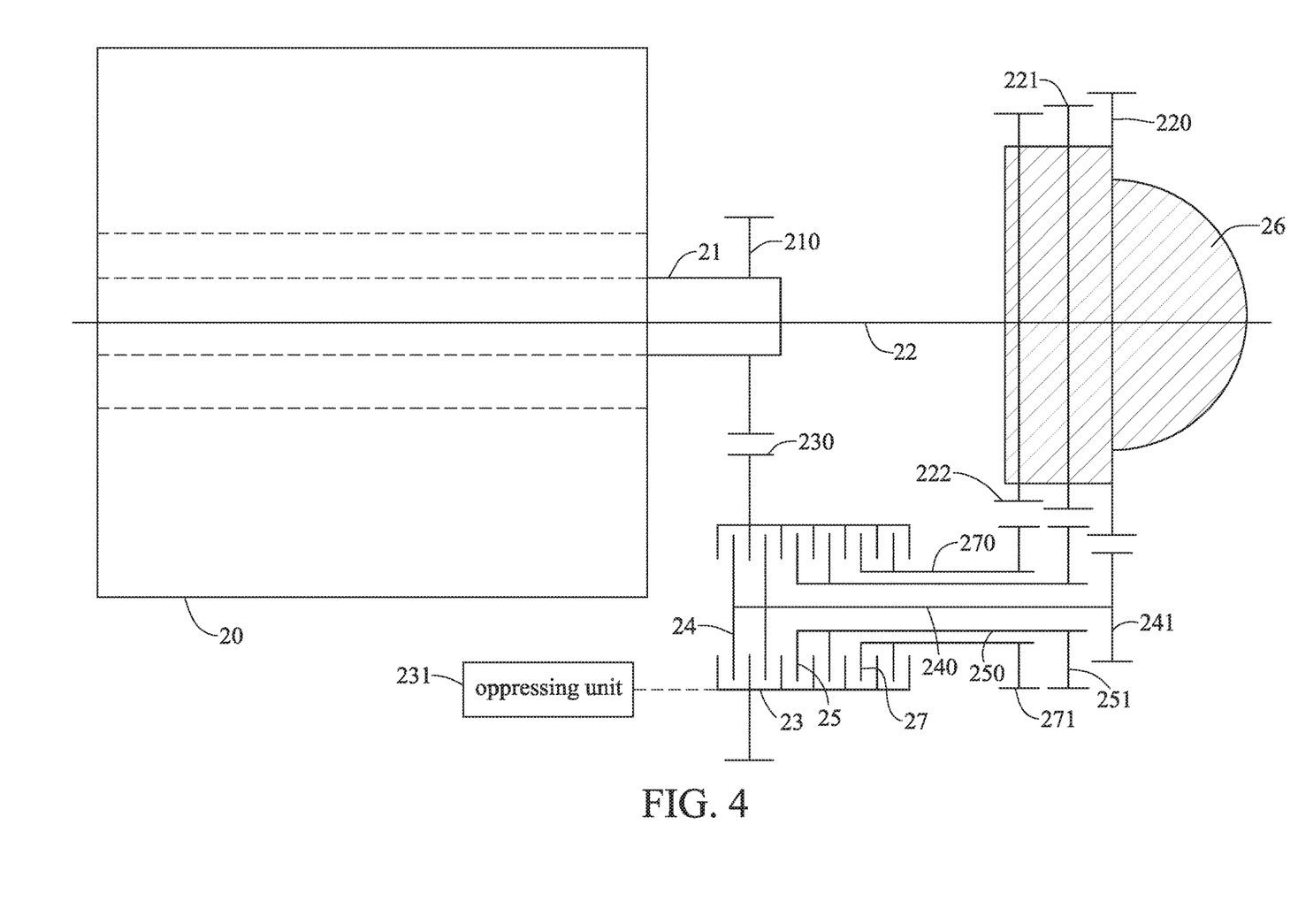
FIG. 4 is a schematic view of the second embodiment of the dual-shaft clutch varying speed device of the disclosure.

FIG. 4 is a schematic view of the second embodiment of the dual-shaft clutch varying speed device of the disclosure. As shown in FIG. 4, the dual-shaft clutch varying speed device of disclosure includes a drive unit (20), an input shaft (21), an output shaft (22), a housing (23), at least an odd-numbered clutch unit (24) and at least an even-numbered clutch unit (25).

The input shaft (21) having an input gear (210) is coupled with the drive unit (20). An end of the output shaft (22) penetrates through the input shaft (21) and the drive unit (20) while the other end of the output shaft (22) having at least an odd-numbered output gear (220) and at least an even-numbered output gear (221) is connected to a differential (26).

If the odd-numbered output gear (220) is plural in number, it can be denoted by the first odd-numbered output gear to the $N^{th}$ odd-numbered output gear where N is a constant while if the even-numbered output gear (221) is plural in number, it can be denoted by the first even-numbered output gear to the $N^{th}$ even-numbered output gear where N is a constant.

The housing (23) has a housing gear (230) and an oppressing unit (231), The housing gear (230) is meshed with the input gear (210).

The odd-numbered clutch unit (24) being furnished in the inner part of the housing (23) and being coupled with the oppressing unit (231) has an odd-numbered clutch shaft (240) and an odd-numbered clutch gear (241).

The odd-numbered clutch gear (241) being meshed with the odd-numbered output gear (220) is furnished at an end of the odd-numbered clutch shaft (240) which penetrates through and juts out of an even-numbered clutch shaft (250). Moreover, the odd-numbered output gear (220) drives the output shaft (22) to act as the fist gear power output.

The even-numbered clutch unit (25) being furnished at the inner part of the housing (23) and being coupled with the oppressing unit (231) has the even-numbered clutch shaft (250) and an even-numbered clutch gear (251). An end of the even-numbered clutch shaft (250) penetrates through and jutted out of the housing (23). The even-numbered clutch gear (251) being furnished at the outer edge of the even-numbered clutch shaft (250) and being jutted out of an end of the housing (23) is meshed with the even-numbered output gear (221). The even-numbered output gear (221) drives the output shaft (22) to act as the second gear power output.

Another even-numbered clutch unit (26) being furnished at the inner part of the housing (23) and being coupled with the oppressing unit (231) has another even-numbered clutch shaft (260) and another even-numbered clutch gear (261). An end of the even-numbered clutch shaft (260) penetrates through and jutted out of the housing (23). The even-numbered clutch gear (261) being furnished at the outer edge of the even-numbered clutch shaft (260) and being jutted out of an end of the housing (23) is meshed with another even-numbered output gear (221) which drives the output shaft (22) to act as the third gear power output.

As described above, the odd-numbered clutch unit (24), the even-numbered clutch unit (25), the odd-numbered output gear (220), the even-numbered output gear (221) and the odd-numbered output gear (222) altogether form a third gear varying speed mechanism.

If the odd-numbered output gear (24) is plural in number, it can be denoted by the first odd-numbered clutch unit to the $N^{th}$ odd-numbered clutch unit (14) where N is a constant. Similarly, the odd-numbered clutch shaft (240) can be denoted by the first odd-numbered clutch shaft (240) to the $N^{th}$ odd-numbered clutch shaft where N is a constant.

The odd-numbered clutch gear (241) can be denoted by the first odd-numbered clutch gear to the $N^{th}$ odd-numbered clutch gear. The first odd-numbered clutch gear being meshed with the first odd-numbered output gear can be subsequently derived to that the $N^{th}$ odd-numbered clutch gear is meshed with the $N^{th}$ odd-numbered output gear.

If the even-numbered clutch unit (25) is plural in number, it can be denoted by the first even-numbered clutch unit to the $N^{th}$ even-numbered clutch unit where N is a constant. Similarly, the even-numbered clutch shaft (250) can be denoted by the first even-numbered clutch shaft to the $N^{th}$ even-numbered clutch shaft where N is a constant.

As described above, the first odd-numbered clutch shaft penetrates through the first even-numbered clutch shaft; the first even-numbered clutch shaft penetrates through the second odd-numbered clutch shaft; the second odd-numbered clutch shaft penetrates through the second even-numbered clutch shaft; and sequentially it can be derived to that the $N^{th}$ odd-numbered clutch shaft penetrates through the $N^{th}$ even-numbered clutch shaft.

Therefore, the odd-numbered clutch shaft (240) can also be a hollow shaft provided for the even-numbered clutch shaft to penetrate through, and also the even-numbered clutch shaft (250) can be a hollow shaft provided for the odd-numbered clutch shaft (240) to penetrate through.

The even-numbered clutch gear (251) can be denoted by the first even-numbered clutch gear (251) to the $N^{th}$ even-numbered clutch gear (251). The first even-numbered clutch gear (251) being meshed with the first even-numbered output gear (221) can be subsequently derived to that the $N^{th}$ even-numbered clutch gear (251) is meshed with the $N^{th}$ even-numbered output gear (221).

As shown in FIG. 4, in the present embodiment, the odd-numbered clutch unit (24) can be the first odd-numbered clutch unit (24) [to continue following the previous element numeral (24) to facilitate statement] and the second odd-numbered clutch unit (27) while the even-numbered clutch unit (25) can be the first even-numbered clutch unit (25) [to continue following the previous element numeral (25) to facilitate statement].

An end of the first even-numbered clutch shaft (250) [to continue following the previous element numeral (250) to facilitate statement] of the first even-numbered clutch unit (25) juts out of the housing (23). Moreover, the first even-numbered clutch gear (251) [to continue following the previous element numeral (251) to facilitate statement] of the first even-numbered clutch unit (25) is furnished at the jutted end and is meshed with the first even-numbered output gear (221) [to continue following the previous element numeral (221) to facilitate statement] of the output shaft (22).

An end of the first odd-numbered clutch shaft (240) [to continue following the previous element numeral (240) to facilitate statement] of the first odd-numbered clutch unit (24) penetrates through the first even-numbered clutch shaft (250) and juts out of the first even-numbered clutch shaft (250). The first odd-numbered clutch gear (241) [to continue following the previous element numeral (241) to facilitate statement] of the first odd-numbered clutch unit (24) is furnished at an end while the first odd-numbered clutch shaft (240) juts out of the first even-numbered clutch shaft (250). Moreover, the first odd-numbered clutch gear (241) is meshed with the first odd-numbered output gear (220) [to continue following the previous element numeral (220) to facilitate statement] of the output shaft (22).

An end of the second odd-numbered clutch shaft (270) of the second odd-numbered clutch unit (27) juts out of the housing (23) and penetrates through by the first even-numbered clutch shaft (250). The second odd-numbered clutch gear (271) of the second odd-numbered clutch unit (27) is furnished at an end while the second odd-numbered clutch shaft (270) juts out of the housing (23). The second odd-numbered clutch gear (271) is meshed with second odd-numbered output gear (222) of the output shaft (22).

The dimensions of the second odd-numbered output gear (222), the first even-numbered output gear (221) and the first odd-numbered output gear (220) are all different. These dimensions can be from small to large or from large to small depending on the actual design.

As described above, sequentially the drive unit (20) drives the input shaft (21); the drives the input shaft (21) drives the input gear (210); the input gear (210) drives the housing gear (230); the housing gear (230) drives the housing (23).

The oppressing unit (231) provides an oil pressure, a pneumatic pressure or an oppressing force to make the odd-numbered clutch unit (24) or the even-numbered clutch unit (25) tightly oppress the housing (23).

If the first odd-numbered clutch unit (24) or the second odd-numbered clutch unit (27) tightly oppresses the housing (23), either the first odd-numbered clutch shaft (240) drives the first odd-numbered clutch gear (241) or the second odd-numbered clutch shaft (270) drives the second odd-numbered clutch gear (271). The first odd-numbered clutch gear (241) drives the first odd-numbered output gear (220) so as to make the driven first odd-numbered output gear (220) drive the output shaft (22); or the second odd-numbered clutch gear (271) drives the second odd-numbered output gear (222) so as to make the driven second odd-numbered output gear (222) drive the output shaft (22).

Similarly, if the odd-numbered clutch unit (24) is the first odd-numbered clutch unit to the $N^{th}$ odd-numbered clutch unit, then the first odd-numbered clutch unit to the $N^{th}$ odd-numbered clutch unit can be regarded as the first gear speed output, the third gear speed output, the fifth gear speed output to the $M^{th}$ gear speed output, where M is an odd number.

If the first even-numbered clutch unit (25) tightly oppresses the housing (23), then the first even-numbered clutch shaft (250) drives the even-numbered clutch gear (251), and the even-numbered clutch gear (251) drives the first even-numbered output gear (221), then the driven first even-numbered output gear (221) drives the output shaft (22).

Similarly, if the even-numbered clutch unit (24) is the first even-numbered clutch unit to the $N^{th}$ even-numbered clutch unit, then the first even-numbered clutch unit to the $N^{th}$ even-numbered clutch unit can be regarded as the second gear speed output, the fourth gear speed output, the sixth gear speed output to the $O^{th}$ gear speed output, where O is an even number.

To summarize the above statement, the dual-shaft clutch varying speed device of the disclosure is for integrating the drive (e.g. engine or motor) and transmission of the existing vehicle to make the dual-shaft clutch varying speed device possess the characteristics of small overall volume and high power density.

Through the technological means that an end of the output shaft penetrates through the input shaft and the drive unit, the dual-shaft clutch varying speed device of the disclosure is capable of diminishing the volume of the varying speed structure of the existing vehicle. As described above, by employing the technological means of multi-clutch-unit and multi-through-shaft, the dual-shaft clutch varying speed device of the disclosure is capable of diminishing the overall volume of the varying speed system by at least 38%.

It will become apparent to those people skilled in the art that various modifications and variations can be made to the structure of the disclosure without departing from the scope or spirit of the disclosure. In view of the foregoing description, it is intended that all the modifications and variation fall within the scope of the following appended claims and their equivalents.

What is claimed is:

1. A dual-shaft clutch varying speed device, comprising:
a drive unit;
an input shaft having an input gear is coupled with the drive unit;
an output shaft with an end thereof penetrates through the input shaft and the drive unit, while its other end has at least an odd-numbered output gear and at least an even-numbered output gear;
a housing having a housing gear;
at least an odd-numbered clutch unit being furnished at an inner part of the housing has an odd-numbered clutch shaft and an odd-numbered clutch gear; and
at least an even-numbered clutch unit being furnished at the inner part of the housing has an even-numbered clutch shaft and an even-numbered clutch gear;
wherein one end of the odd-numbered clutch shaft penetrates through the even-numbered clutch shaft and juts out of the even-numbered clutch shaft, and the odd-numbered clutch gear being furnished at an end of the odd-numbered clutch shaft and is meshed with odd-numbered output gear juts out of an end of the even-numbered clutch shaft; an end of the even-numbered clutch shaft penetrates through the housing and juts out of the housing, the even-numbered clutch gear being meshed with the even-numbered output gear is furnished at the end where the even-numbered clutch shaft juts out of the housing;
where the odd-numbered clutch shaft juts out of the even-numbered clutch shaft; the odd-numbered clutch gear is meshed with the odd-numbered output gear, one end of the odd-numbered clutch shaft penetrates through the even-numbered clutch shaft and juts out of the even-numbered clutch shaft, and the odd-numbered clutch gear is furnished at an end where the odd-numbered clutch shaft juts out of the even-numbered clutch shaft; the odd-numbered clutch gear is meshed with the odd-numbered output gear.

2. The dual-shaft clutch varying speed device as claimed in claim 1, wherein the input shaft being a hollow shaft is provided for the output shaft to penetrate through.

3. The dual-shaft clutch varying speed device as claimed in claim 1, wherein the input gear being furnished at the outer edge of the input shaft rotates together with the output shaft.

4. The dual-shaft clutch varying speed device as claimed in claim 1, wherein the output shaft is parallel to the odd-numbered clutch shaft.

5. The dual-shaft clutch varying speed device as claimed in claim 1, wherein both the odd-numbered clutch unit and the even-numbered clutch unit are plural in number.

6. The dual-shaft clutch varying speed device as claimed in claim 1 further comprising a differential.

7. The dual-shaft clutch varying speed device as claimed in claim 6, wherein the differential driven by the output gear to drive the output shaft and make the output shaft outputs torque or power so as to further drive the differential.

8. The dual-shaft clutch varying speed device as claimed in claim 7, wherein the output gear is meshed with the odd-numbered clutch gear or the even-numbered clutch gear respectively to rotate.

9. The dual-shaft clutch varying speed device as claimed in claim 6, wherein the even-numbered clutch shaft being a hollow shaft is provided for the odd-numbered clutch shaft to penetrate through.

10. The dual-shaft clutch varying speed device as claimed in claim 1, wherein the other odd-numbered clutch shaft being a hollow shaft is provided for the even-numbered clutch shaft to penetrate through.

11. The dual-shaft clutch varying speed device as claimed in claim 1, wherein the odd-numbered clutch gear being secured at the outer edge of the odd-numbered clutch shaft rotates with the odd-numbered clutch shaft while the even-numbered clutch gear being secured at the outer edge of the even-numbered clutch shaft rotates with the even-numbered clutch shaft.

12. The dual-shaft clutch varying speed device as claimed in claim 1, wherein the output shaft is connected to a differential.

13. The dual-shaft clutch varying speed device as claimed in claim 1, wherein the housing further possesses an oppressing unit which is coupled with both the odd-numbered clutch unit and the even-numbered clutch unit, and the oppressing unit makes the odd-numbered clutch unit or even-numbered clutch unit tightly oppresses the housing.

14. The dual-shaft clutch varying speed device as claimed in claim 13, wherein the oppressing unit is an oil pressure device or a pneumatic device.

15. The dual-shaft clutch varying speed device as claimed in claim 13, wherein the oppressing unit is a brake device which is furnished inside the housing.

16. The dual-shaft clutch varying speed device as claimed in claim 1, wherein the odd-numbered clutch unit, the even-numbered clutch unit, the odd-numbered output gear and the even-numbered output gear form a second gear varying speed mechanism.

17. The dual-shaft clutch varying speed device as claimed in claim 16, wherein the odd-numbered clutch unit, the even-numbered clutch unit, the another odd-numbered clutch unit, the odd-numbered output gear, the even-numbered output gear and another odd-numbered output gear form a third gear varying speed mechanism.

18. The dual-shaft clutch varying speed device as claimed in claim 17, wherein the odd-numbered clutch shaft of the odd-numbered clutch unit penetrates through the even-numbered clutch shaft of the even-numbered clutch unit.

19. The dual-shaft clutch varying speed device as claimed in claim 1, wherein another even-numbered clutch shaft of the another even-numbered clutch unit penetrates through the outer edge of the even-numbered clutch shaft of the even-numbered clutch unit.

20. The dual-shaft clutch varying speed device as claimed in claim 1, wherein another odd-numbered output gear meshes with another odd-numbered clutch gear, another odd-numbered output gear drives the output shaft to act as a third gear power output.

\* \* \* \* \*